United States Patent
Kumar et al.

(10) Patent No.: US 9,336,185 B1
(45) Date of Patent: May 10, 2016

(54) GENERATING AN ELECTRONIC PUBLICATION SAMPLE

(71) Applicants: Sudhir Kumar, Adambakkam (IN); Surendran Rangasamy, Tamil Nadu (IN)

(72) Inventors: Sudhir Kumar, Adambakkam (IN); Surendran Rangasamy, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 819 days.

(21) Appl. No.: 13/622,153

(22) Filed: Sep. 18, 2012

(51) Int. Cl.
*G06F 17/21* (2006.01)

(52) U.S. Cl.
CPC ..................................... *G06F 17/21* (2013.01)

(58) Field of Classification Search
CPC . G06F 17/211; G06F 17/217; G06F 17/2229; G06F 17/241; G06F 17/24; G06F 17/21
See application file for complete search history.

(56) References Cited

U.S. PATENT DOCUMENTS

| | | | |
|---|---|---|---|
| 2002/0046018 A1* | 4/2002 | Marcu | G06F 17/271 704/9 |
| 2013/0041747 A1* | 2/2013 | Anderson et al. | 705/14.39 |

\* cited by examiner

*Primary Examiner* — Kyle Stork
(74) *Attorney, Agent, or Firm* — Lowenstein Sandler LLP

(57) ABSTRACT

A system and method for generating an electronic publication (e.g., an e-book) sample having an end point designated in accordance with a set of heuristics. A start reading location is identified within the content of an electronic publication. A sample block is identified which includes a percentage of the content following the start reading location. A set of heuristics (e.g., rules) configured to identify an end point for the e-book sample is applied to a selected portion of the content within the sample block. The end point of the sample block is designated according to the set of heuristics and the electronic publication sample having the designated end point is stored.

19 Claims, 5 Drawing Sheets

406 { Lorem ipsum dolor sit amet, consectetur adipiscing elit. Cras laoreet dui in erat venenatis id condimentum mauris volutpat. Etiam in tortor sodales libero rutrum egestas. Nam semper pharetra sapien sed vehicula. Duis lorem enim, tristique nec posuere vitae, placerat interdum mauris. Proin nisi sem, rutrum id molestie vitae, vehicula in felis. Vivamus eget venenatis est. Morbi purus tortor, pulvinar ultrices adipiscing vitae, tempus ac orci. Curabitur cursus velit in turpis consectetur tempus. Fusce placerat, sapien ultrices ornare lobortis, erat diam semper sapien, id tristique nunc sapien ut enim. Vivamus velit est, hendrerit at commodo quis, faucibus a lorem. Maecenas vel libero libero. Quisque consectetur, augue sit amet pellentesque euismod, dolor risus malesuada lorem, non ornare dolor tellus id enim. Sed in libero tellus. Suspendisse at massa lacus. Nulla pellentesque lacus et tellus ornare sit amet suscipit erat placerat.

402

404 { Donec purus tortor, convallis vel fringilla a, volutpat ut massa. Duis molestie dignissim nulla quis pellentesque. Aliquam suscipit pharetra eros consequat ultrices. Maecenas tristique libero sit amet tortor commodo vestibulum. Etiam lobortis ligula vitae ipsum commodo vitae euismod turpis accumsan. Etiam sit amet leo ligula, sed adipiscing dolor. Cras ultricies ultrices mi, et laoreet nunc accumsan eget. Sed ac urna ligula, non elementum tellus.

Phasellus sapien lectus, consequat in facilisis ullamcorper, porttitor non lorem. Aenean odio diam, luctus nec viverra eget, malesuada vitae velit. Vestibulum ante ipsum primis in faucibus orci luctus et ultrices posuere cubilia Curae; Praesent pharetra tincidunt blandit. Proin elit enim, faucibus ac lobortis a, accumsan convallis felis. Suspendisse et tincidunt erat. Suspendisse potenti. Curabitur dui ipsum, imperdiet sed molestie sed, malesuada et justo. Fusce porta facilisis velit, at eleifend sem volutpat ut. Sed id lacus quis lectus gravida dictum non et arcu. Morbi facilisis, mi at lacinia volutpat, ligula augue condimentum risus, et euismod mi elit ac elit. Etiam id dui mauris, ac volutpat tortor. Etiam tristique enim sapien, et condimentum ligula. Maecenas et eros ultrices est consectetur imperdiet ut in velit. Ut id nisi dolor, quis pellentesque est.

408

Quisque pulvinar ante et orci malesuada vel tempor lacus sollicitudin. Nulla sed diam nec ipsum pulvinar adipiscing nec ut mauris. Morbi fermentum euismod orci, id aliquam augue posuere ut. Cras libero dui, gravida non vestibulum at, suscipit vitae magna. Cum sociis natoque penatibus et magnis dis parturient montes, nascetur ridiculus mus. Aliquam imperdiet elementum tellus in pharetra. Aliquam pellentesque blandit risus, sit amet placerat est commodo et.

410

GENERATING AN ELECTRONIC PUBLICATION SAMPLE

BACKGROUND OF THE INVENTION

A sample or portion of the electronic book (e-book) may be presented to a reader prior to the reader's purchase of the e-book. Typically an e-book sample in generated by taking a fixed percentage of the e-book's content. However, this approach results in e-book samples having an arbitrary and often illogical ending point (e.g., an ending point of the sample in the middle of a word or a sentence). The presentation of an e-book sample with a random and undesirable ending point provides a negative experience for the reader, which may impact the reader's decision regarding the purchase of the e-book.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 4 illustrates an example electronic book sample.

DETAILED DESCRIPTION OF THE PRESENT INVENTION

Figure 1:
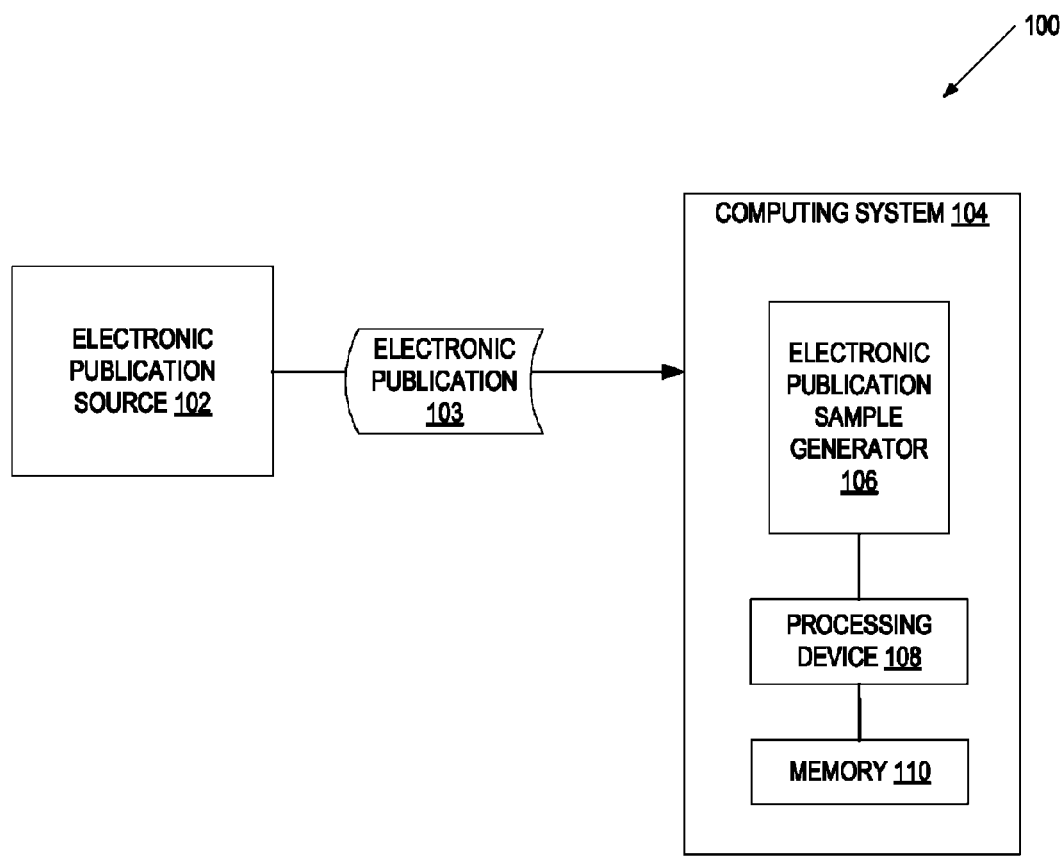
FIG. 1 illustrates a block diagram of an exemplary computing environment including an electronic publication sample generator.

A system and method for analyzing content of an electronic publication (e.g., an electronic text-based book, an audio book, a video publication (e.g., a video book, a movie), etc.) or book to generate an optimized sample of the electronic publication. A sample generator may apply a set of heuristics (e.g., one or more rules, preferences, priorities, etc.) configured to identify a logical end point for the content of the electronic book (or "e-book") sample. The content of the electronic publication may be in any suitable format, including, for example, text, audio, video, etc. Furthermore, the content may be in any suitable language, such as, for example, English, Japanese, Latin, etc. The generated e-book sample may be stored and presented to a user via a graphical user interface (GUI) (e.g., a GUI providing an interface to an e-book purchasing platform). Generating an e-book sample with a logical end point provides a reader with a positive viewing experience by eliminating an arbitrary and abrupt cutting off of the sample. In embodiments, the end point of the e-book sample (e.g., the location where the e-book sample ends or terminates) may be designated or set at a paragraph end point, a sentence end point, or a word end point. Designating the end point of the e-book sample may include identifying a location within the e-book sample corresponding to a paragraph end point (i.e., a location marking and/or representing the end of a paragraph), a sentence end point (i.e., a location marking and/or representing the end of a sentence), or as a word end point (i.e., a location marking and/or representing the end of a word). It is noted that the end point may be any location within the content of e-book following a word, symbol, space, string of characters, series of words, etc. which represents the cut off of the e-book sample, such that the content following the end point is not included in the e-book sample that is generated for presentation to a user.

In embodiments, a start reading location (SRL) is identified within the content of the e-book. As used herein, the start reading location refers to any suitable designation and/or identifier of a position or location within the content of an e-book which represents a starting position for a reader to begin reading a publication. In an embodiment, the start reading location may be designated by the creator or publisher of the e-book or according to a default determined by the electronic publication platform and may be represented in the content of the publication by a tag. The start reading location tag or identifier may be set within the text of a publication in accordance with rules, formats, processes, and/or protocols established by the electronic publication platform. In an example, the start reading location may be set by conducting a keyword search for a particular term (e.g., "Chapter 1") associated with a common and/or desirable location with the e-book at which a reader may start reading.

In embodiments, a portion of the content including a percentage of the content following the start reading location is identified (also referred to as a "sample block"). In order to identify a logical end point for the e-book sample, a set of heuristics may be applied to the content within a selected portion of the sample block (also referred to as a "window"). In embodiments, the selected portion of the sample block or window may be a percentage of the total content of the e-book file (e.g., a portion of the sample block equal to 2% of the total content) or a percentage of the content of the sample block (e.g., a portion of the sample block equal to 10% of the sample block). The content of the sample block within the window is searched, reviewed and/or analyzed in accordance with the set of heuristics to identify a desired end point (e.g., a cut-off or ending position) for the e-book sample.

In an embodiment, an example set of heuristics may include the consideration of one or more priorities (e.g., preferences) for the designation of an end point of the e-book sample. In an example, the set of heuristics may be based on the application of multiple priorities (e.g., an end point priority ranking), wherein the content within the window (i.e., the selected portion of the content of the sample block) is reviewed and an end point is designated based on the priority ranking. In an embodiment, the set of heuristics may be configured to assign a first priority (e.g., a most preferred end point) for the e-book sample end point to a paragraph end point, a second priority for the e-book sample end point to a sentence end point (e.g., a sentence end denoted by a punctuation mark or other equivalent symbol), and a third priority for the e-book sample end point to a word end (e.g., white space). Advantageously, applying the set of heuristics to the content within the designated portion of the sample block (i.e., the window) ensures that the e-book sample does not end in the middle of a word or character string.

In an embodiment, the content may be an audio book, wherein a desired end point for the audio book sample is identified by ending the audio book sample at a point where a gap between detected speech (e.g., a portion of silence or audio below a certain volume level) is greater than a predefined threshold (e.g., an average gap time amount determined by sampling the audio book). For example, a pitch or volume (or relative changes of the parameters) of a recorded voice of an audio book may be detected and analyzed to determine a word, sentence, and/or paragraph end point in the audio book. For example, audio parameters of the recording may be considered to identify a transition of the recorded content from one speaker to another, and the transition may be used to represent a word, sentence, and/or paragraph end point.

In an embodiment, the content may be a video publication (e.g., a video book, a movie, etc.), wherein a desired end point for the video book sample is identified by ending the video book sample at a point where a scene within the video book changes (e.g., upon detection of a scene transition marker). For example, a key frame representing a contextual change of the video may be detected and an end point may be designated in proximity to the key frame (e.g., right before the key frame). Advantageously, the designation of an end point relative to the key frame provides for a smoother cut or end to the video book.

In an embodiment, any suitable heuristics may be applied, such as, for example, the identification of a chapter end or a section end. In an embodiment, the heuristics may be selected based on the format of the digital publication. For example, for poetry and other similar content, a heuristic may be applied relating to the identification of a stanza end point. In another example, for a text book, a heuristic may be applied relating to the identification of a heading or a definition, to avoid ending the sample in the middle of a heading or definition.

FIG. 1 is a block diagram of an exemplary computing environment 100 including a computing system 104 configured to implement an electronic publication sample generator 106, according to embodiments of the present invention. As shown in FIG. 1, the electronic publication sample generator 106 is configured to receive content of an electronic publication (e.g., an electronic book or e-book) 103 from an electronic publication source 102. In an embodiment, the electronic publication 103 may be received by the computing system 104 executing the electronic publication sample generator 106 via a network (not shown), such as, for example, a public network such as the Internet, a private network such as a local area network (LAN), or a virtual private network (VPN)).

The electronic publication source 102 may be any suitable computing device (e.g., a server computer or a desktop computer), a data store (e.g., a database), and/or electronic book publishing platform configured to receive, store, and/or process one or more electronic books 103. In an embodiment, the electronic publication source 102 may include a graphical user interface (GUI) and publishing platform configured to receive and process an e-book submitted (e.g., uploaded) by an e-book creator (e.g., a writer or publisher). In one example, the electronic publication source 102 may be a suitable publishing platform configured to receive uploaded platform-ready files or other file types that may be converted to a suitable platform-ready file format.

According to embodiments of the present invention, the electronic publication 103 may be an electronic book in any suitable format, such as, for example, an AEH format, a Broadband eBooks (BBeB) format, an eReader format, a HTML format (e.g., HTML5), an iBook format, a KF8 format, a CSS3 format, a Portable Document Format (PDF), or the like.

In an embodiment, the electronic publication sample generator 106 is a software component or application (e.g., a set of instructions residing in memory 110) executable by a processing device 108 (e.g., a processor) configured to generate a sample having a logical end point for the electronic publication 103.

In an embodiment, the electronic publication sample generator 106 may be hosted by a computing system 104 (e.g., a server, a desktop computer, a portable digital assistant, a mobile phone, a laptop computer, a portable media player, a tablet computer, a netbook, a notebook, or a personal computer). The computing system 104 may include a processing device 108 and a memory 110. The memory 110 may be any suitable memory or data storage location, including a non-transitory computer readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

In an embodiment, the processing device 108 and memory 110 may be the local processing device and memory of the electronic publication sample generator 106. In another embodiment, the electronic publication sample generator 106 may be installed on a computing device from any suitable non-transitory computer-readable storage medium or via network (e.g., by a download). It is noted that any suitable arrangement may be employed such that the electronic publication sample generator 106 may perform the functions described in detail below in connection with FIGS. 2 and 3.

Figure 2:
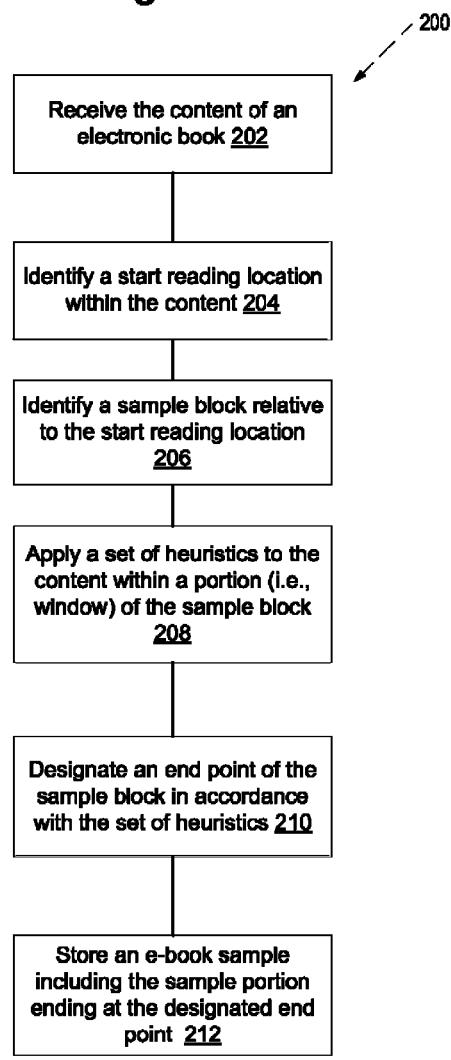
FIG. 2 is a flow diagram of an exemplary method for generating a sample associated with an electronic publication.

FIG. 2 is an exemplary flow diagram of one embodiment of a method 200 for identifying an end point for an e-book publication sample. The method 200 is performed by processing logic that may comprise hardware (circuitry, dedicated logic, etc.), software (such as is run on a general purpose computer system or a dedicated machine), or a combination of both. In one embodiment, the method 200 is performed by a processing device configured to execute an electronic publication sample generator (e.g., the electronic publication sample generator 106 of FIG. 1).

Referring to FIG. 2, in one embodiment, the method 200 includes receiving a file including the content of an electronic book, in block 202. In an embodiment, the content of the electronic book may include any arrangement of text and may be in any suitable format and/or language (e.g., English, Chinese, Latin, etc.). The content of the electronic book may be received from any suitable electronic publication source, such as an electronic book platform configured to receive the e-book file from an e-book creator. The electronic publication source may be any suitable computing device (e.g., a server computer, desktop computer, tablet, etc.) or a data store (e.g., a database) configured to receive and process an e-book file and provide the e-book file to the electronic publication sample generator.

In an embodiment, in block 204, a start reading location within the content of the e-book file is identified. The start reading location is a position, place or location within the content of the electronic publication which represents a starting point of useful content (e.g., content that may serve as a quality sample of the e-book). The start reading location represents an appropriate place for a user to begin reading, such as, for example, the start of Chapter 1 of the e-book. The start reading location may be any position within the content of the e-book and may be designated by the e-book creator during the uploading of the e-book file to the e-book platform. In another example, the start reading location may be set by the e-book platform based on one or more default rules and/or conditions (e.g., the e-book platform may set the start reading location at the beginning of the first chapter of the e-book). In embodiments, the start reading location may be denoted in the content of the e-book by a tag (e.g., an HTML tag) or other identifier capable of being detected by parsing the e-book file. It is noted that for a video publication (e.g., a video book or a movie), a start viewing location may be set. In addition, for an audio book, it is noted that a start listening location may be set.

Upon identification of the start reading location, a percentage or portion of the content relative to the start reading location is identified (referred to as a "sample block"), in block 206. In an embodiment, the sample block includes a designated percentage of content (e.g., 10% of the total content) following the start reading location. Optionally, in an embodiment, the e-book sample may also include all or a portion of the content preceding the start reading location (also referred to as a "pre-SRL portion"). The percentage of content following the start reading location that is included in the sample block may be designated by the e-book creator or set by the electronic publication sample generator. It is noted that any percentage, number of characters, or other suitable unit of measure may be used to identify the sample block. In another example, the sample block may defined as including 1,000 characters following the start reading location and all of the content prior to the start reading location.

In block 208, a set of heuristics are applied to content within a portion of the sample block (i.e., the content within a window). The window may any designated percentage or portion of the sample block that is searched, reviewed and/or analyzed in accordance with the set of heuristics. In an embodiment, the window may be a percentage of the total content of the e-book file (e.g., the window is 2% of the total content). In an embodiment, a beginning point of the window may be set at any suitable position within the sample block and may be identified by adding a selected percentage of the total content of the e-book file to the identified SRL. For example, the start of the window may be placed by starting at the SRL and adding 5% of the total content. In this example, if the total content is 1,000 characters, then the window may start 50 characters after the SRL. It is noted that the selected percentage used to determine the starting point of the window may be a fixed number of characters (e.g., 50 characters, 100 characters, etc.) or any percentage of the total content (e.g., 2% of the total content, 5% of the total content, etc.). Applying the window to the sample content provides a portion of content that is reviewed in accordance with the set of heuristics. In an embodiment, the set of heuristics may be applied to content within the window by identifying a nearest end point in accordance with a set of priorities (e.g., a paragraph end point is a first priority, a sentence end point is a second priority, and a word end point is third priority) in either a forward looking manner (e.g., a window starting point is identified and the content following that point is reviewed in accordance with the heuristics in order to identify an end point for the sample block) or a backward looking manner (e.g., a window starting point is identified and the content before that point is reviewed in accordance with the heuristics in order to identify an end point for the sample block).

According to embodiments, the set of heuristics represent rules and conditions configured to parse the content within the window to identify and designate an optimized end point for the e-book sample (e.g., a position, location, or place to end, terminate, or cut off the e-book sample) within the window, in block 210. The various types of points within the content of the e-book (e.g., a paragraph end point, a sentence end point, a word end point) may be designated within the e-book file by suitable identifiers, instructions, or tags. In accordance with the set of heuristics, the content within the window may be searched and parsed in order to identify certain information (e.g., an identifier, symbol, tag, character, keywords, etc.) representing a paragraph end point (i.e., a paragraph end point identifier), a sentence end point (i.e., a sentence end point identifier), and/or a word end point (i.e., a word end point identifier). For example, a paragraph end point may be designated within an HTML-based file by a closing P tag ("</p>"). In another example, a sentence end point may be designated by a punctuation mark, symbol or character denoting the end of a sentence, and may be in any language (e.g., sentence end points in Latin, Chinese, Japanese languages). In yet another example, a word end point may be designated by whitespace (e.g., spaces, tabs, newlines, etc.) or a non-breaking space tag (e.g., an " " or " " tag). In an embodiment, the set of heuristics may include rules configured to recognize any type of sentence end points (e.g., zero-width non-joiners), including sentence end points used in any language (e.g., Japanese, Chinese, Greek, etc.), and may include the rules of punctuation for multiple different languages which may be applied and reviewed in connection with the identification of the word, sentence, or paragraph end points.

In an embodiment, the set of heuristics are configured to assign a first priority for the end point of the sample block to a paragraph end point. In an embodiment, the set of heuristics are configured to assign a second priority for the end point of the sample to a sentence end point (e.g., denoted by a punctuation mark or other symbol). In an embodiment, the set of heuristics are configured to assign a third priority for the end point of the sample to a word end point (e.g., at the end of a word or character string).

In an embodiment, application of the set of heuristics to the content within the window provides for a repeatable and predictable generation of an e-book sample having a logical end point determined according to a suitable priority. For example, the set of heuristics may be configured to identify an end point according to a priority wherein a paragraph end point represents a most preferred end point, a sentence end point represents a second most preferred end point, and a word end point represents a third most preferred end point.

In an embodiment, the set of heuristics may be configured to identify the paragraph end point that is located last in the window (also referred to as the 'last identified paragraph end point'), a sentence end point that is located last in the window (also referred to as the 'last identified sentence end point'), or word end point that is located last in the window (also referred to as the 'last identified word end point).

In an example, the electronic publication sample generator may apply the set of heuristics and identify three paragraphs ends within the window (e.g., Paragraph End Point 1 located first in the window, Paragraph End Point 2 located second in the window, and Paragraph End Point 3 located last in the window). In this example, the electronic publication sample generator may designate the location of Paragraph End Point 3 as the end point of the sample block.

In an embodiment, the set of heuristics may be configured to designate the first point identified within the window as the end point of the sample block. For example, the content within the window may be searched for any one of a paragraph end point, a sentence end point, or a word end point. In this example, upon identification of any of the point types, the first identified point is designated as the end point of the sample block and the review of the window is terminated. It is noted that the set of heuristics may be configured to apply any suitable rules and/or priority for designation of the end point within the window such that the end point is not arbitrarily defined. A process flow illustrating the application of an exemplary set of heuristics is described below in connection with FIG. 3.

Figure 3:
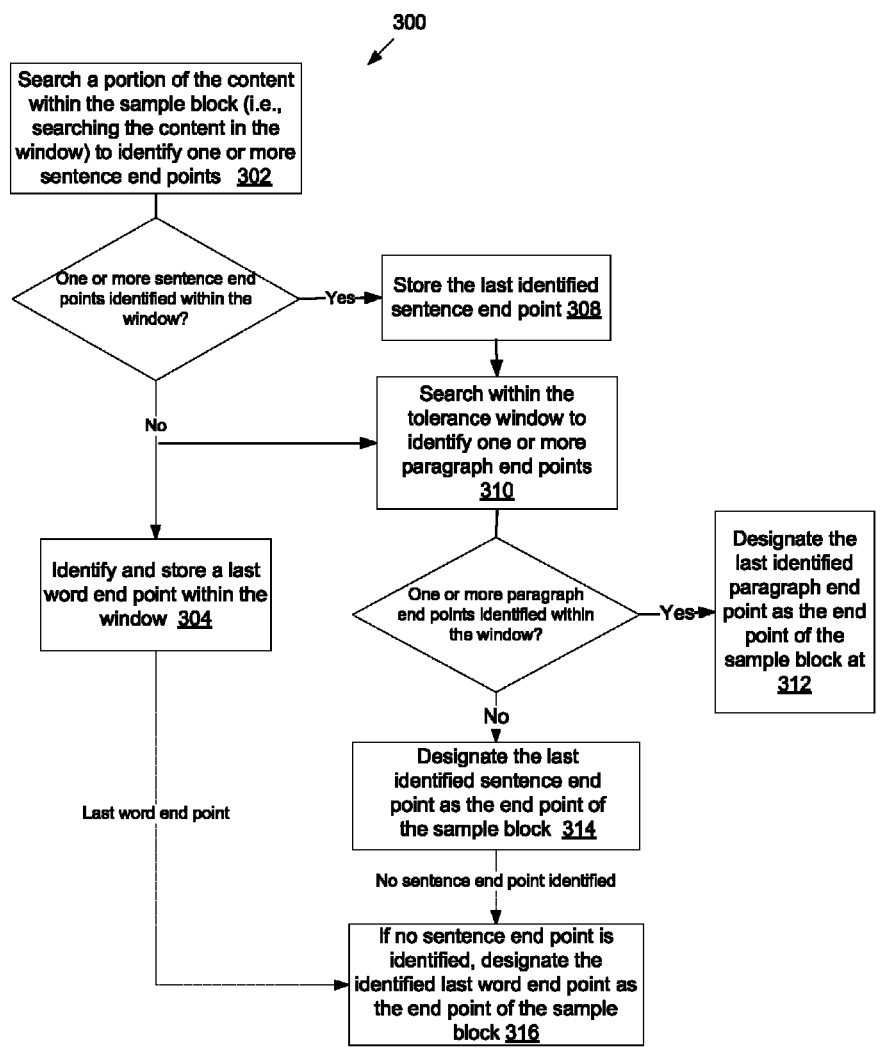
FIG. 3 is a flow diagram of a method for generating a sample associated with an electronic publication according to an exemplary set of heuristics.

In block 212, an e-book sample including the sample block ending at the designated end point is then stored in a suitable computer-readable memory. The stored e-book sample includes a logical cut-off or end point of one of a paragraph end point, a sentence end point or a word end. The end point of the sample block designated in block 210 is then stored FIG. 3 is a flow diagram of one embodiment of a method 300 for identifying an end point for an e-book publication sample according to an exemplary set of heuristics. In an embodiment, the method 300 presents an exemplary embodiment of blocks 208 and 210 of FIG. 2. Method 300 presents an exemplary process flow associated with the application of a set of heuristics configured to identify an end point according to a priority wherein a paragraph end point represents a most preferred end point (e.g., a first priority), a sentence end point represents a second most preferred end point (e.g., a second priority), and a word end point represents a third most preferred end point (e.g., a third priority). The method 300 is performed by processing logic that may comprise hardware (circuitry, dedicated logic, etc.), software (such as is run on a general purpose computer system or a dedicated machine), or a combination of both. In one embodiment, the method 300 is performed by a processing device configured to execute an electronic publication sample generator (e.g., the electronic publication sample generator 106 of FIG. 1).

In block 302, a search is performed of the content within the window to identify one or more sentence end points. In an example, the one or more sentence end points may be represented by a punctuation mark (e.g., a period, exclamation point, question mark, etc.). If no sentence end points are identified within the window, then a last word end point in the window is identified and stored, in block 304. The last identified word end point is then designated as the end point of the sample block, in block 316, if no paragraph end point is identified (in block 310). The identified last word end point represents the word end located last in the window (e.g., the word end that is nearest to the end of the window). In an embodiment, the electronic publication sample generator may search the entire window, identify every word end point and designate the word end point appearing last in the window as the end point of the sample block (e.g., the cut off or stopping point for the e-book sample). In another embodiment, if no sentence end points are identified, the electronic publication sample generator may begin to search from the end of the window until a first word end point is identified, and designated this identified word end point as the end point of the sample block, in block 306.

If during the search in block 302 one or more sentence end points are identified within the window, the last identified sentence end point (e.g., the sentence end point appearing last in the window) is stored, in block 308. Optionally, according to another embodiment, in block 308, if multiple sentence end points are identified, any of the identified sentence end points may be stored. In another embodiment, searching within the window for a sentence end point (in block 302) may terminate once a first sentence end point is identified and the first identified sentence end point may be stored in block 308.

As shown in FIG. 3, if no sentence end points are identified or following the identification and storage of the last identified end point (in block 308), the content within the window is searched in order to identify one or more paragraph end points, in block 310. It is noted that the search of the content within the window for a sentence end point (in block 302) and the search of the content within the window for a paragraph end point (in block 310) may be performed at the same time or serially. If, in block 310, one or more paragraph end points are identified within the window, then one of the at least one identified paragraph end points is designated as the end point of the sample block in block 312. In an embodiment, the last identified paragraph end point (e.g., the paragraph end point appearing closest to the end of the window) is designated as the end point of the sample block. In another embodiment, the first identified paragraph end point (e.g., the paragraph end point that is first identified during the searching of the content within the window) is designated as the end point of the sample block.

If no paragraph end point is identified in block 310, then the last identified sentence end point is designated as the end point of the sample block in block 314. If no paragraph end point is identified in block 310 and no sentence end point is identified in block 310, then the last word end point (identified in block 304) is designated as the end point of the sample block in block 316. It is noted that a sentence end point may also be a paragraph end point. Once the set of heuristics, such as the exemplary configuration illustrated in FIG. 3, have been applied to the content of the window, the e-book sample including the designated sample block end point is stored for later retrieval and review by a user (e.g., a prospective purchaser of the e-book reviewing the e-book sample via an e-book purchasing platform).

FIG. 4 illustrates an example electronic publication reviewed in accordance with embodiments of the methods and systems of the present disclosure. In this example, a start reading location 402 is identified at a point beginning with the text "Donec purus tortor . . . ". In an embodiment, the start reading location 402 is selected and/or identified to begin at a useful portion of the text. In this example, the point beginning with the text "Donec purus tortor . . . " represents a first chapter of the electronic publication.

As shown in FIG. 4, a sample block 404 representing a certain percentage of the overall content of the electronic publication is identified. In this example, the sample block 404 is set to begin at the start reading location. Optionally, the e-book sample may also include a pre-SRL portion 406 (e.g., including the content preceding the SRL and ranging back to any location prior to the SRL, including a beginning of the electronic publication 401).

In an embodiment, a set of heuristics is applied to the content within a window 408 applied to sample block. In this example, applying the set of heuristics described in connection with the method shown in FIG. 3, a designated end point 410 for the sample block 402 is identified at the last identified paragraph end point following the text " . . . est commodo et.". Accordingly, the generated electronic publication sample in this example includes the content beginning with the text "Donec purus tortor . . . " and ending with the text " . . . est commodo et.". Optionally, if the sample block 402 includes the pre-SRL portion 404, the generated electronic publication sample includes the content beginning with the text "Lorem ipsum dolor . . . " and ending with the text " . . . est commodo et." 401. In the example shown in FIG. 4, the generated e-book sample begins at the SRL 402 and ends at the designated end point 410, and as such, the generated e-book sample is equivalent to the sample block 404. It is noted that the generated e-book sample may be different from the sample block 404 depending, for example, on the placement of the window 408, the location of the designated end point, and whether a pre-SRL portion is included in the e-book sample.

Figure 5:
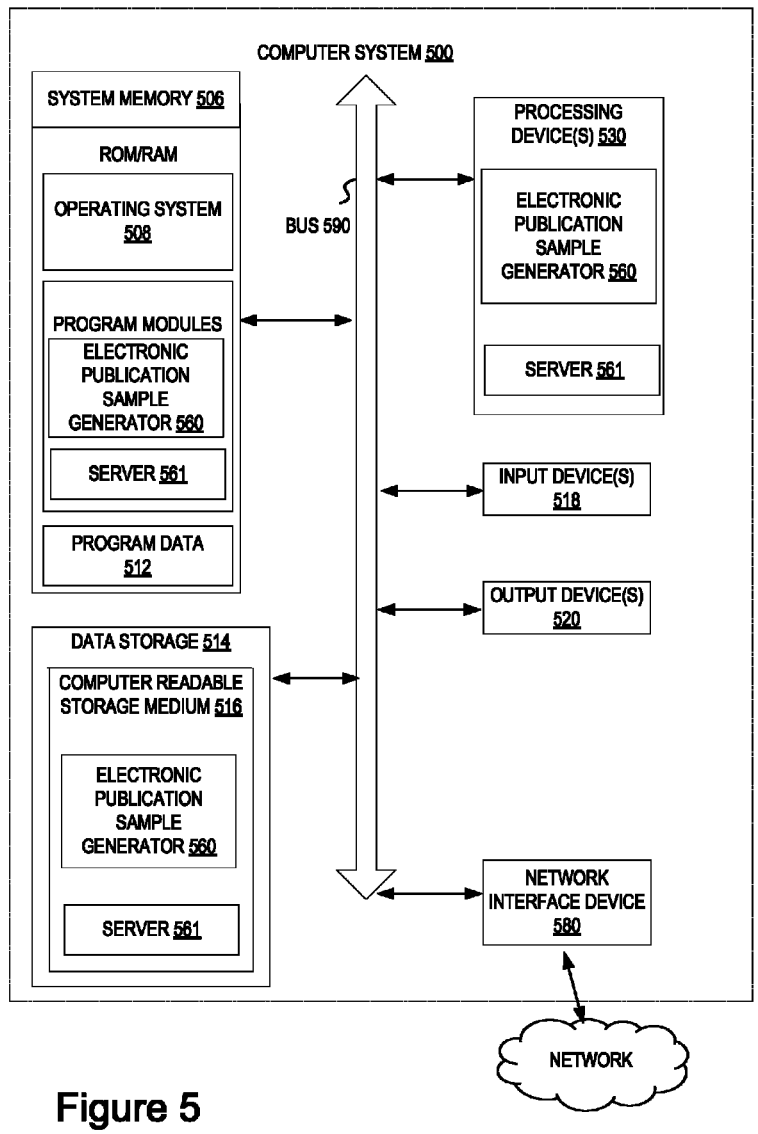
FIG. 5 illustrates an exemplary computing system.

FIG. 5 is a block diagram illustrating an exemplary computer system 500 configured to perform any one or more of the methodologies performed herein. Computer system 500 may be any type of computing device such as an electronic book reader, a PDA, a mobile phone, a laptop computer, a portable media player, a tablet computer, a camera, a video camera, a netbook, a desktop computer, a gaming console, a DVD player, a television, a computing pad, a media center, a rackmount server, a desktop computer, a network router, switch or bridge, or any other computing device. In one embodiment, the computer system 500 corresponds to a machine of the computing system 104 of FIG. 1.

The computer system 500 may operate in the capacity of a server or a client machine in client-server network environment, or as a peer machine in a peer-to-peer (or distributed) network environment. Further, while only a single machine is illustrated, the computer system 500 shall also be taken to include any collection of machines that individually or jointly execute a set (or multiple sets) of instructions to perform any one or more of the methodologies discussed herein.

The computer system 500 includes one or more processing devices 530, which may include general-purpose processing devices such as central processing units (CPUs), microcontrollers, microprocessors, systems on a chip (SoC), or the like. The processing devices 530 may further include dedicated chipsets, application specific integrated circuits (ASIC), field programmable gate arrays (FPGA), digital signal processors (DSP), network processors, or the like. The user device 500 also includes system memory 506, which may correspond to any combination of volatile and/or non-volatile storage mechanisms. The system memory 506 stores information which may provide an operating system component 508, various program modules 510 such as an electronic publication sample generator 560 and server 561 (which may correspond to electronic publication sample generator 106 and computing system 104, respectively), program data 512, and/or other components. The computer system 500 may perform functions by using the processing device(s) 530 to execute instructions provided by the system memory 506. Such instructions may be provided as software or firmware. Alternatively, or additionally, the processing device(s) 530 may include hardwired instruction sets. The processing device 530, system memory 506 and additional components may communicate via a bus 590.

The computer system 500 may also include a data storage device 514 that may be composed of one or more types of removable storage and/or one or more types of non-removable storage. The data storage device 514 includes a computer-readable storage medium 516 on which is stored one or more sets of instructions embodying any one or more of the methodologies or functions described herein. As shown, instructions for an electronic publication sample generator 560 and/or server 561 may reside, completely or at least partially, within the computer readable storage medium 516, system memory 506 and/or within the processing device(s) 530 during execution thereof by the computer system 500, the system memory 506 and the processing device(s) 530 also constituting computer-readable media. Additionally, instructions for a streaming client (not shown) may reside in the computer readable storage medium, system memory 506 and/or processing devices 530.

While the computer-readable storage medium 516 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The user device 500 may also include one or more input devices 518 (keyboard, mouse device, specialized selection keys, etc.) and one or more output devices 520 (displays, printers, audio output mechanisms, etc.). Computer system 500 may additionally include a network interface device 580 such as a network interface card (NIC) or wireless modem to connect to a network. The network interface device 580 may provide network connectivity using any type of wired or wireless network technology including, for example, Ethernet, Firewire, universal serial bus (USB), Thunderbolt, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), WiFi, long term evolution (LTE), worldwide interoperability for microwave access (WiMAX), etc.

In the above description, numerous details are set forth. It will be apparent, however, to one of ordinary skill in the art having the benefit of this disclosure, that embodiments of methods and systems may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "searching", "designating", "storing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the embodiments of the methods, systems, and apparatus should, therefore, be determined with reference to the appended claims, along with the full scope of equivalents to which such claims are entitled.

What is claimed is:

1. A method comprising:
receiving, by a processing device, content of an electronic book;
identifying, by the processing device, a start reading location within the content of the electronic book and a sample block comprising a percentage of the content following the start reading location;
searching, by the processing device, a selected portion of content within the sample block to identify a last sentence end point and to identify a last paragraph end point;
designating one of the last sentence end point or the last paragraph end point as an end point of the sample block in accordance with a set of rules comprising a first rule and a second rule, wherein the last paragraph end point is designated as the end point of the sample block in accordance with the first rule and wherein the last sentence end point is designated as the end point of the sample block in accordance with the second rule, and wherein the first rule is assigned a higher priority than the second rule; and
storing an electronic book sample comprising the sample block ending at the designated end point.

2. The method of claim 1, wherein the selected portion of content is one of a percentage of the content of the electronic book or a percentage of the content within the sample block.

3. The method of claim 1, further comprising parsing the selected portion of content to identify information representing at least one of the last sentence end point or the last paragraph end point, wherein the information comprises at least one of an identifier, a character, a symbol, a tag, or a keyword.

4. The method of claim 1, further comprising:
identifying a plurality of sentence end points within the selected portion of content, wherein one of the plurality of sentence end points is located nearest to an end of the selected portion of content; and
storing the sentence end point located nearest to the end of the selected portion of content as the last sentence end point.

5. The method of claim 1, wherein the electronic book sample further comprises at least a portion of content located before the start reading location.

6. A non-transitory computer readable medium having instructions that, when executed by a processing device, cause the processing device to perform a method comprising:
identifying, by the processing device, a start reading location within content of an electronic publication;
identifying a sample block comprising a percentage of the content following the start reading location;
designating an end point of the sample block in accordance with a set of rules comprising a first rule, a second rule, and a third rule having a prioritized order, wherein a paragraph end point is designated as the end point of the electronic book sample in accordance with the first rule, wherein a sentence end point is designated as the end point of the sample block in accordance with the second rule, and wherein a word end point is designated as the end point of the sample block in accordance with the third rule; and
generating an electronic publication sample comprising the sample block comprising the end point of the sample block.

7. The non-transitory computer readable medium of claim 6, further comprising providing the electronic publication sample comprising the sample block ending at the designated end point.

8. The non-transitory computer readable medium of claim 6, further comprising:
searching a selected portion of content within the sample block to identify a plurality of sentence end points, wherein one of the plurality of sentence end points is located nearest to an end of the selected portion of content; and
storing the sentence end point located nearest to the end of the selected portion of content as the last sentence end point.

9. The non-transitory computer readable medium of claim 8, further comprising:
searching the selected portion of content to identify a paragraph end point for designation as the end point of the electronic book sample.

10. The non-transitory computer readable medium of claim 9, further comprising designating the last sentence end point as the end point of the electronic book sample if no paragraph end point is identified.

11. The non-transitory computer readable medium of claim 8, wherein the selected portion of content is a percentage of the content of the electronic book.

12. The non-transitory computer readable medium of claim 6, further comprising:
searching a selected portion of content within the sample block to identify a sentence end point;
searching the selected portion of content within the sample block to identify a paragraph end point;
identifying a plurality of word end points within the selected portion of content, wherein one of the plurality of word end points is located nearest to an end of the selected portion of content; and
storing the sentence end point nearest to the end of the selected portion of content as the last sentence end point.

13. The non-transitory The computer readable medium of claim 12, further comprising designating the last word end point as the end point of the electronic book sample if no sentence end point and no paragraph end point are identified.

14. A computing system comprising:
a memory to store instructions; and
a processing device, operatively coupled to the memory, the processing device to execute the instructions to:
generate an electronic book sample comprising a sample block of content of an electronic book, the sample block ending at an end point designated as one of a paragraph end point, a sentence end point or a word end point in accordance with a set of rules comprising a first rule to designate the paragraph end point as the end point of the sample block, a second rule to designate the sentence end point as the end point of the sample block, and a third rule to designate the word end point as the end point of the sample block, wherein the first rule, the second rule, and the third rule are applied in a prioritized order; and
store the electronic book sample comprising the sample block of content of the electronic book.

15. The computing system of claim 14, the processing device to identify a start reading location within the content of the electronic book, wherein the sample block comprises a percentage of the content of the electronic book following the start reading location.

16. The computing system of claim 15, the processing device to search a selected portion of the content within the sample block for the sentence end point, the paragraph end point, and the word end point.

17. The computing system of claim 16, the processing device to:
- search the selected portion of content within the sample block to identify a plurality of sentence end points, wherein one of the plurality of sentence end points is located nearest to an end of the selected portion of content; and
- store the sentence end point located nearest to the end of the selected portion of content as the last sentence end point.

18. The computing system of claim 17, the processing device to designate the last sentence end point as the end point of the electronic book sample if no sentence end point and no paragraph end point are identified.

19. The computing system of claim 15, wherein the start reading location is identified by searching the content of the electronic book for an identifier of the start reading location set by a publisher of the electronic book.

\* \* \* \* \*